United States Patent [19]

Kojima et al.

[11] Patent Number: 5,263,176

[45] Date of Patent: Nov. 16, 1993

[54] METHOD OF ASSIGNING OPTIMAL CHANNEL IN MULTI-STATION RADIO COMMUNICATIONS SYSTEM

[75] Inventors: Susumu Kojima, Tokyo; Tetsuro Hanazawa, Kanagawa, both of Japan

[73] Assignees: NEC Corporation; Nippon Telegraph and Telephone Corp., both of Tokyo, Japan

[21] Appl. No.: 652,722

[22] Filed: Feb. 8, 1991

[30] Foreign Application Priority Data

Feb. 8, 1990 [JP] Japan .................................. 2-30102
Feb. 8, 1990 [JP] Japan .................................. 2-30103

[51] Int. Cl.$^5$ ........................... H04Q 7/00; H04B 1/10
[52] U.S. Cl. ................................. 455/34.1; 455/34.2; 455/54.2; 455/62; 455/63
[58] Field of Search .................... 455/34.1, 34.2, 54.1, 455/56.1, 62, 63, 53.1, 17, 33.1

[56] References Cited

U.S. PATENT DOCUMENTS 3,764,915 10/1973 Cox et al. ............................ 455/34.1
4,747,101 5/1988 Akaiwa et al. ...................... 455/34.2
5,111,534 5/1992 Benner ............................... 455/34.1

*Primary Examiner*—Reinhard J. Eisenzopf
*Assistant Examiner*—Christine K. Belzer
*Attorney, Agent, or Firm*—Sughrue, Mion, Zinn, Macpeak & Seas

[57] ABSTRACT

In a multi-station radio communications system wherein plural channels are accessible for communication between plural fixed stations and plural mobile units (viz., dynamic channel assignment) and wherein each of plural fixed stations selects a channel according to channel assignment priority data, the radio channels are grouped into a plurality of channel groups. The channels in each of the channel groups forms a numerically looped sequence of channels. The first channel of the numerically loop sequence in one channel group is different from the first channel of the numerically looped sequence in each of the other channel groups. Each of the plural fixed stations is set to select the channel having the highest priority or to select one of the first channel of the numerically looped sequence and a channel nearest to the first channel in the event that a plurality of channels have the same priority.

8 Claims, 5 Drawing Sheets

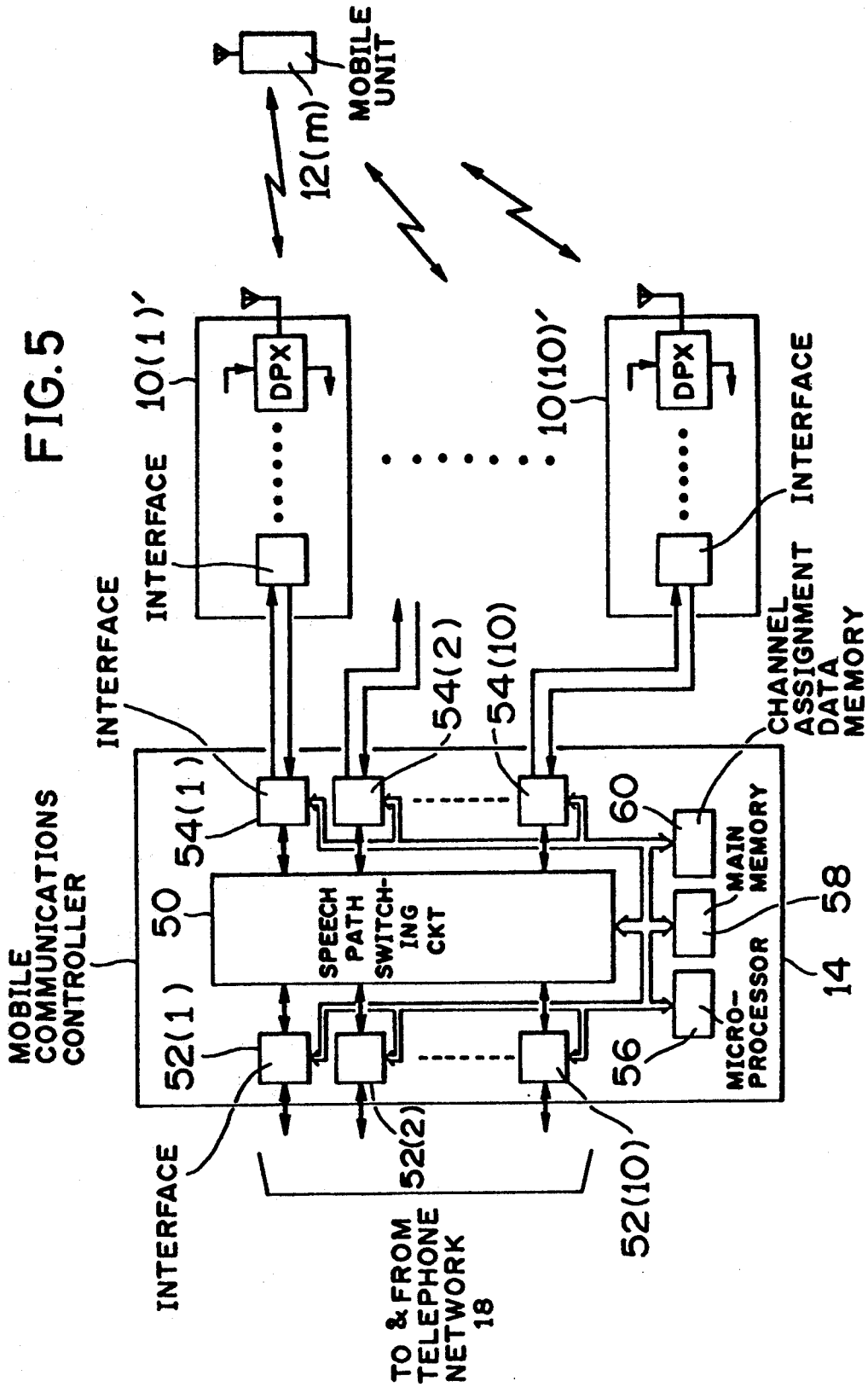

METHOD OF ASSIGNING OPTIMAL CHANNEL IN MULTI-STATION RADIO COMMUNICATIONS SYSTEM

BACKGROUND OF THE INVENTION

1. Field of the Invention

The present invention relates generally to a method of assigning an optimal speech or transmission channel in a multi-station radio communications system, and more specifically to such a method wherein plural fixed stations share in common, all the channels assigned to a system. The present invention is able to minimize co-channel interference and is able to retain optimal channel assignment information in the case of a power failure which cuts off the power supply to one or more of the fixed station(s).

2. Description of the Prior Art

It is known in the art to apply a multi-station radio communications system wherein all of the channels assigned to the system are accessible by a plurality of fixed stations located in the system. This kind of channel assignment is referred to as dynamic channel assignment, and finds extensive application within relatively small service areas such as within a building, factory etc. On the contrary, an application of fixed channel assignment to each of the fixed stations is practically difficult or impossible due to the sophisticated nature of the propagation characteristics. The term "fixed channel assignment" implies that each of fixed stations closely located is assigned a plurality of fixed carrier frequencies. The fixed channel assignment features a so-called frequency reuse.

In order to avoid co-channel interference in either of dynamic or fixed channel assignment systems, it is well known in the art that a given fixed station selects an optimal channel according to channel assignment priority data which has been accumulated in the given station from the beginning of the system operation. More specifically, the channel assignment priority of a given channel at a given station is raised if it is accessed and used for communication, and is lowered if accessed but fails to establish communication. Viz., a channel which is more likely to provide optimal communication, is given a higher rating or priority over those which tends to exhibit less preferable characteristics and which are apt not to provide the required characteristics.

However, when the system is initially put into use, all of the channels provided for the system have the same priority. That is to say, there is no difference in the channel priority. According to one prior art technique, all of the fixed stations are set to select the lowest numbered channel at the initial stage of operation.

Accordingly, this prior art system has suffered from the drawbacks that as the fixed stations operate independently of one another and the lowest numbered channel is initially used at each of said mobile or stationary stations, in the event that relatively close stations are simultaneously contacted by different mobile units and the stations in question assign the same channel, situations wherein co-channel interference or cross-talk is highly apt to occur.

A further drawback has been encountered in that the channel assignment priority data which is compiled over a period of time is stored in a volatile memory which can be subject to undesirable erasure. More specifically, the above-mentioned prior art system is usually connected with a commercially available power supply, and hence in the event that a power failure or similar type of power disturbance occurs, the power supply which maintains the memory in question is temporarily disturbed/cut-off. In the event of such a memory loss, an undesirably long period of time is required before the channel status data is re-accumulated and the system is restored to the level of operation acquired prior the power interruption. Accordingly, the system is temporarily reduced to the situation wherein the initial cross-talk and/or co-channel interference problems are undesirably encountered all over again.

SUMMARY OF THE INVENTION

It is an object of the present invention to provide a method of eliminating the co-channel interferences which are highly apt to occur at the initial stage of operation.

Another object of the present invention is to provide a method by which the channel assignment priority data which has been compiled over a long period of time can be retained in the event of a power failure.

In brief, the above object is achieved by a method wherein plural channels are accessible for communication between plural fixed stations and plural mobile units (viz., dynamic channel assignment) and wherein each of plural fixed stations selects a channel according to channel assignment priority data, the radio channels are grouped into a plurality of channel groups. The channels in each of the channel groups forms a numerically looped sequence of channels. The first channel of the numerically loop sequence in one channel group is different from the first channel of the numerically looped sequence in each of the other channel groups. Each of the plural fixed stations is set to select the channel having the highest priority or to select one of the first channel of the numerically looped sequence and a channel nearest to the first channel in the event that a plurality of channels have the same priority.

More specifically an aspect of the present invention comes in a method of assigning radio channels in a multi-station radio communication system wherein plural channels are accessible for communication between plural fixed stations and plural mobile units and wherein each of the plural fixed stations selects a channel according to channel assignment priority, the method comprising steps of: (a) grouping the radio channels which are numbered in ascending or descending order, into a plurality of channel groups each of which includes the same number of the radio channels, the number of the channel groups corresponding to the number of the fixed stations, the radio channels in each of the channel groups forming a numerically looped sequence of channels wherein each numerically looped sequence finishes at a channel which is numerically adjacent the first channel of the sequence, the first channel of a numerically looped sequence in one channel group being different from the first channel of the numerically looped sequences in each of the other channel groups; (b) assigning the channel groups to the plural fixed stations on a one-to-one basis; and (c) setting each of the plural fixed stations to select one of the channels assigned thereto which has a highest channel assignment priority, or to select one of the first channel of a numerically looped sequence and a channel nearest to the first channel in the event that plural channels have the same channel assignment priority.

BRIEF DESCRIPTION OF THE DRAWINGS

The features and advantages of the present invention will become more clearly appreciated from the following description taken in conjunction with the accompanying drawings in which like elements are denoted by like reference numerals and in which:

FIG. 5 is block diagram showing a mobile communications switching controller interconnected between a plurality of fixed stations and a telephone network.

DETAILED DESCRIPTION OF THE PREFERRED EMBODIMENTS

Figure 1:
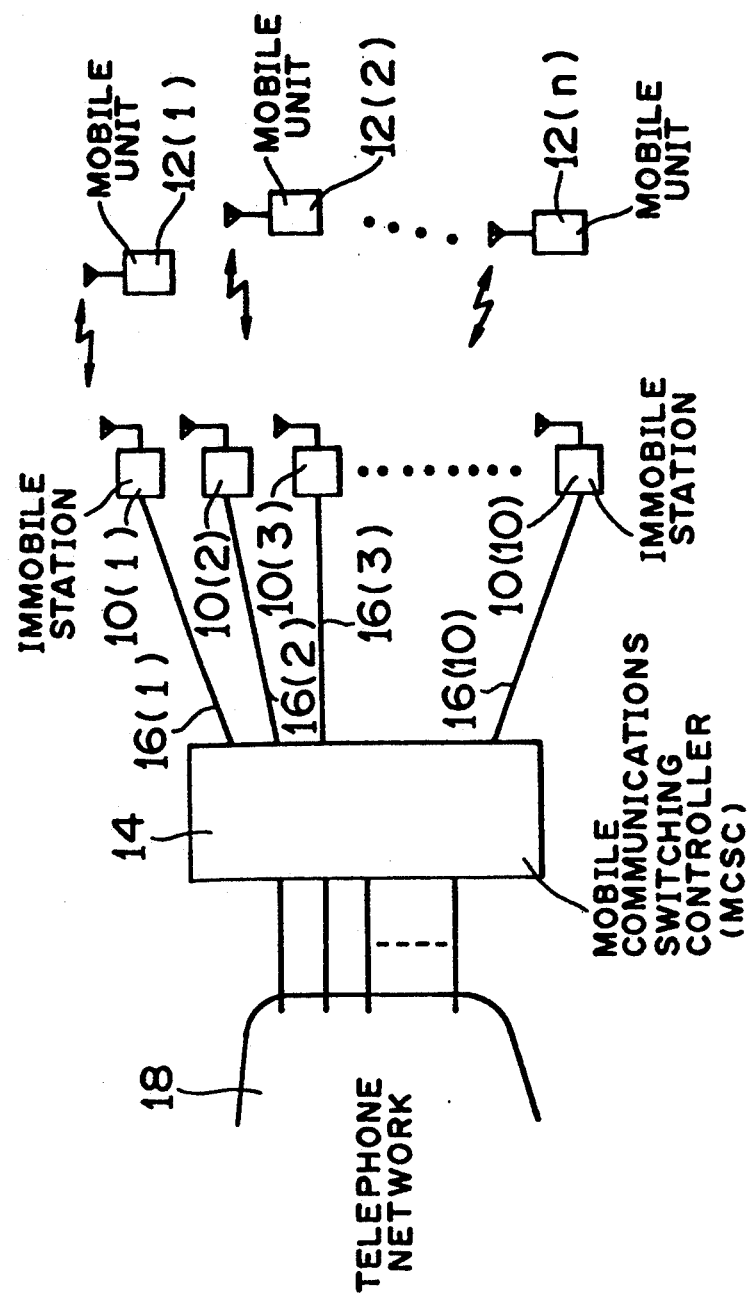
FIG. 1 is a sketch showing the overall system of a multi-station radio communications system which uses dynamic channel assignment and to which the present invention is directed.

FIG. 1 is a sketch schematically illustrating an overall arrangement of a multi-station radio communications system to which the present invention is directed.

A plurality of fixed stations 10(1)-10(10) are provided for communication with a plurality of mobile units 12(1)-12(n). Merely for the convenience of description it is assumed that the number of the fixed stations is ten (10). A mobile communications switching controller (MCSC) 14 is interconnected to the fixed stations 10(1)-10(10) via lines 16(1)-16(10) respectively, and also is coupled to a telephone network 18 via a plurality of lines (no numerals).

Figure 2:
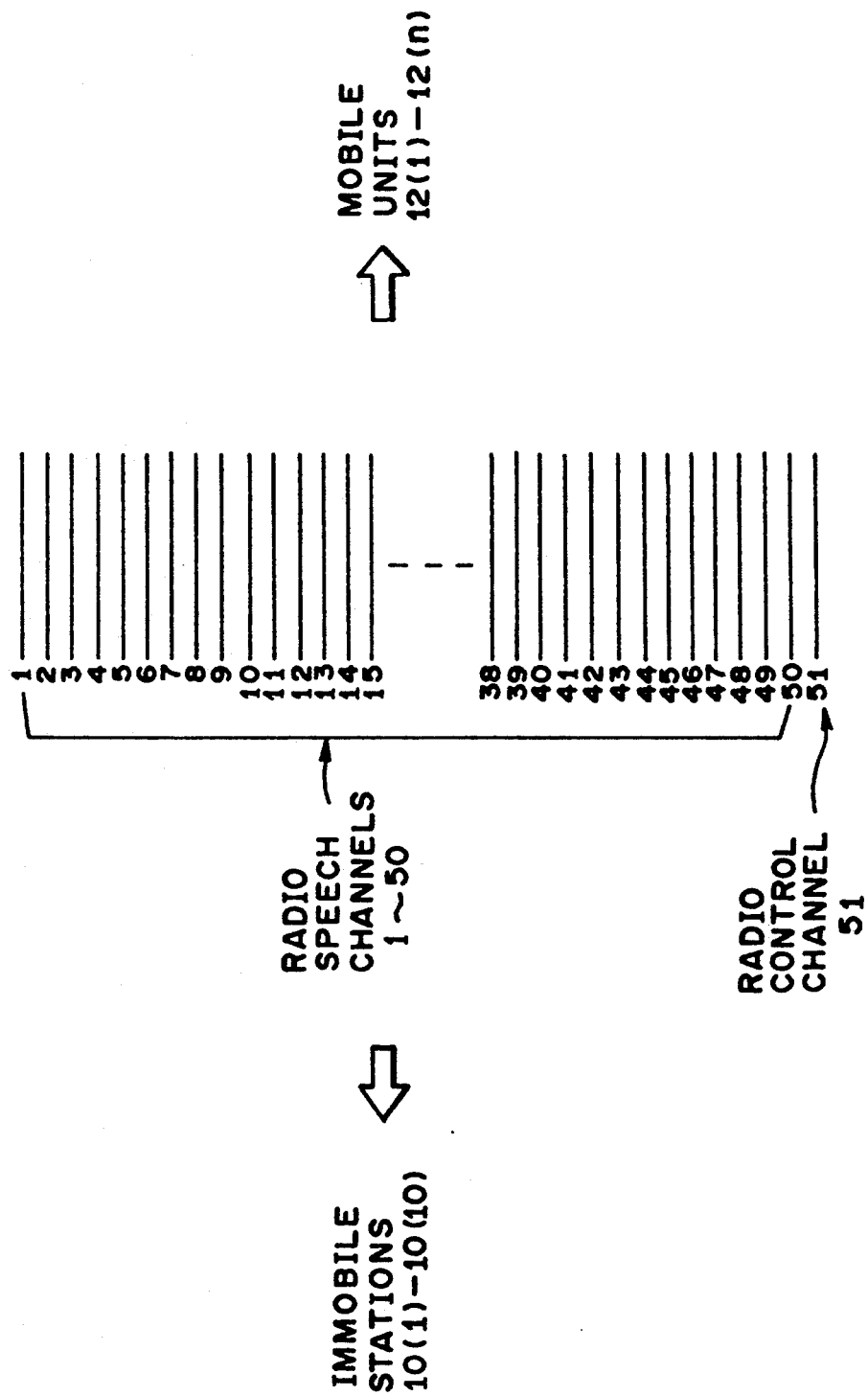
FIG. 2 is a diagram depicting a plurality of radio speech channels which are under the control of each of the fixed stations provided in the system.

As best shown in FIG. 2 each of the mobile units 12(1)-12(n) is able to communicate with each of the fixed stations 10(1)-10(10) through a selected one of plural radio speech channels 1-50. A control channel 51 is provided for managing radio communications between the fixed stations 10(1)-10(10) and the mobile units 12(1)-12(n). The above-mentioned number of the radio speech channels (viz., 50) is merely exemplary and of course is not limited thereto. Further, more than two control channels can be provided if necessary.

Figure 3:
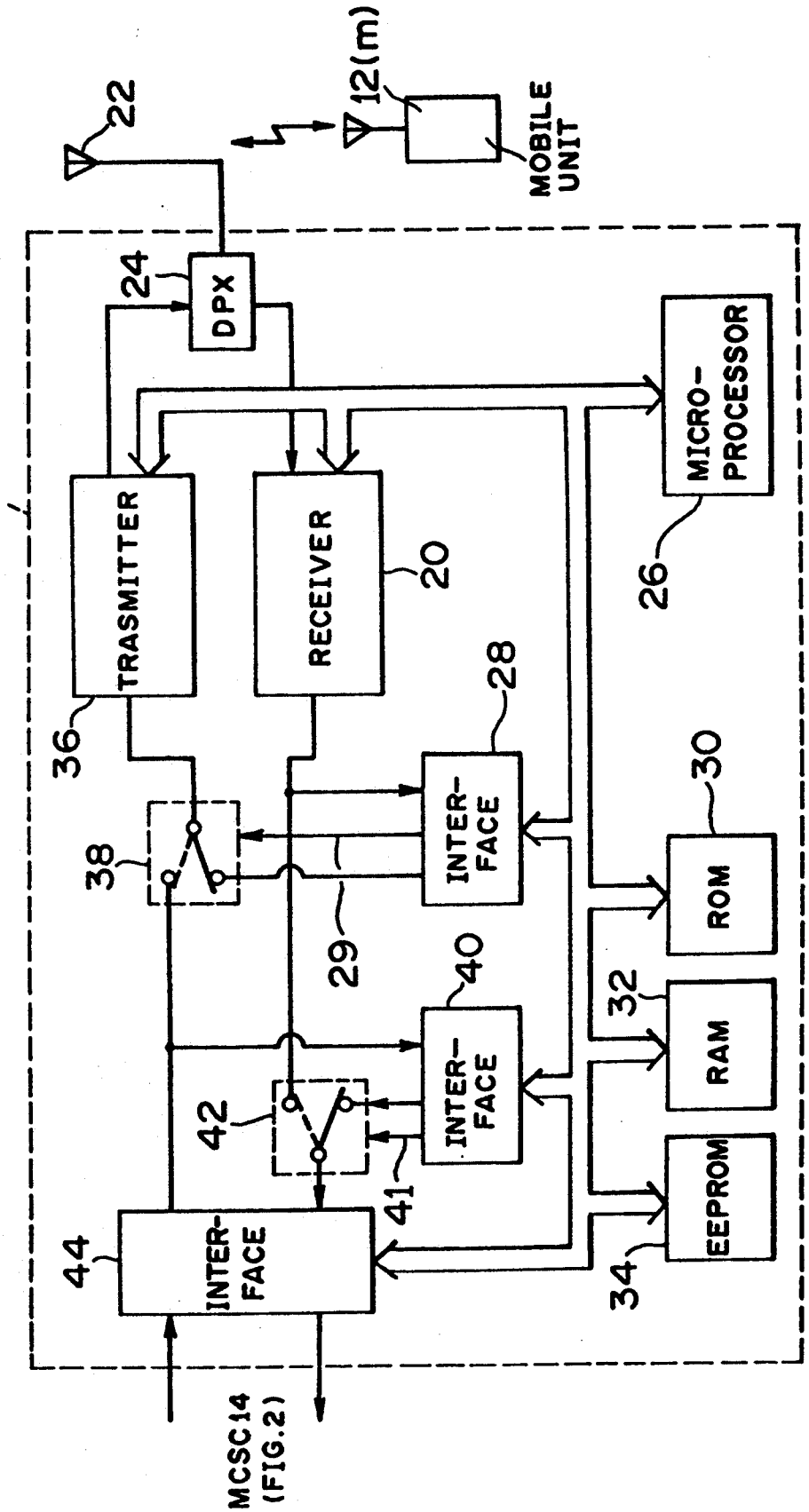
FIG. 3 is a block diagram showing details of circuitry used in each of the fixed stations illustrated in FIG. 1.

Reference is made to FIG. 3, wherein the fixed station 10(1) is shown in detail in block diagram form together with a single mobile unit denoted by 12(m). This mobile unit 12(m) is one of the above-mentioned plural mobile units 12(1)-12(n). It should be noted that each of the other fixed stations 10(2)-10(10) has the same configuration as the station 10(1).

Before discussing the first preferred embodiment in detail, the background thereof will first be described.

Each of a receiver 20 and a transmitter 36 is previously tuned, under control of a microprocessor 26, to a frequency of the control channel 51 (FIG. 2) before a speech channel is established between the station 10 and the mobile unit 12(m). When the mobile unit 12(m) wishes to initiate a call, the call request is transmitted via the control channel 51 to the receiver 20 via an antenna 22 and a duplexer 24. A signal indicative of the call request is demodulated at the receiver 20 and is applied to the microprocessor 26 via an interface 28. The microprocessor 26 supervises the operation of the fixed unit 10(1) using an operation program pre-stored in a ROM (read-only-memory) 30. A RAM (random-access-memory) 32 is used as a work space of the microprocessor 26. A non-volatile memory 34 is provided for storing channel assignment priority data for all of the radio speech channels 1-50 (FIG. 2) in the system in question. The memory 34 takes the form of an EEPROM (electrically erasable programmable ROM) merely by way of example, and is directly concerned with a second preferred embodiment of the present invention as referred to below.

The microprocessor 26 accesses the non-volatile memory 34 in response to the above-mentioned call request and determines an optimal speech channel on the basis of the channel priority information stored in the memory 34. A signal indicative of the selected channel is applied to the transmitter 36 via the interface 28 and a switch 38. The transmitter 36 modulates the selected channel signal with the frequency of the control channel 51 and applies the same to the mobile unit 12(m) via the control channel 51. Thereafter, the microprocessor 26 tunes the receiver 20 and the transmitter 36 to the frequency of the selected channel. The mobile unit 12(m), in response to the selected channel signal received, tunes the transmitter thereof (not shown) to the selected speech channel and sends back a reply to the fixed unit 10(1) via the selected speech channel.

In the event that the microprocessor 26 receives the reply from the mobile unit 12(m) through the selected or assigned channel and detects no co-channel or interchannel interference in connection with the selected speech channel, the microprocessor 26 applies a ready signal to the mobile communications switching controller 14 (FIG. 1) via interfaces 40, 44 and a switch 42. In this event, the microprocessor 26 accesses the non-volatile memory 34 and increases the priority assigned to the radio speech channel selected. Following this, the microprocessor 26 changes the switch positions of the switches 38, 42 to the other positions indicated by broken lines via control lines 29, 41, respectively. Thereafter, the controller 14 issues a dial tone signal which is applied to the mobile unit 12(m) via the interface 44, the switch 38, the transmitter 36, etc., after which the mobile unit 12(m) issues a dialing signal. The following steps will be apparent to those skilled in the art and hence further description will be omitted for brevity.

Contrary to the above case, viz., if the fixed station 10(1) is incapable of receiving the reply from the mobile unit 12(m) via the channel selected, or if the station 10(1) detects channel interference to an undesirable extent in connection with the channel chosen, then the microprocessor 26 lowers the priority assigned to the channel selected.

In the case where a subscriber connected to the telephone network initiates a call to the mobile unit 12(m), the steps similar to the aboves are carried out.

The manner in which the priority assigned to each of the speech channels is renewed is not directly concerned with the present invention and, therefore will not be referred to in detail. For further details concerning the manner in which the just mentioned channel assignment priority renewal is carried out, reference should be made to U.S. Pat. No. 4,747,101 assigned to the same entity as the assignee of this invention, for example.

As will be apparent, when the system shown in FIG. 1 is initially put into use, the priorities assigned to the radio speech channels 1-50 (FIG. 2) are all the same. As mentioned in the opening paragraphs of the instant specification, according to the prior art, during initial start-up each of the fixed stations 10(1)-10(10) is set to use the lowest numbered one of the channels which exhibit the same priority. Accordingly, if the fixed stations 10(1)-10(10) are permitted to independently select speech channels, the prior art has encountered the problem of co-channel interference.

Figure 4:
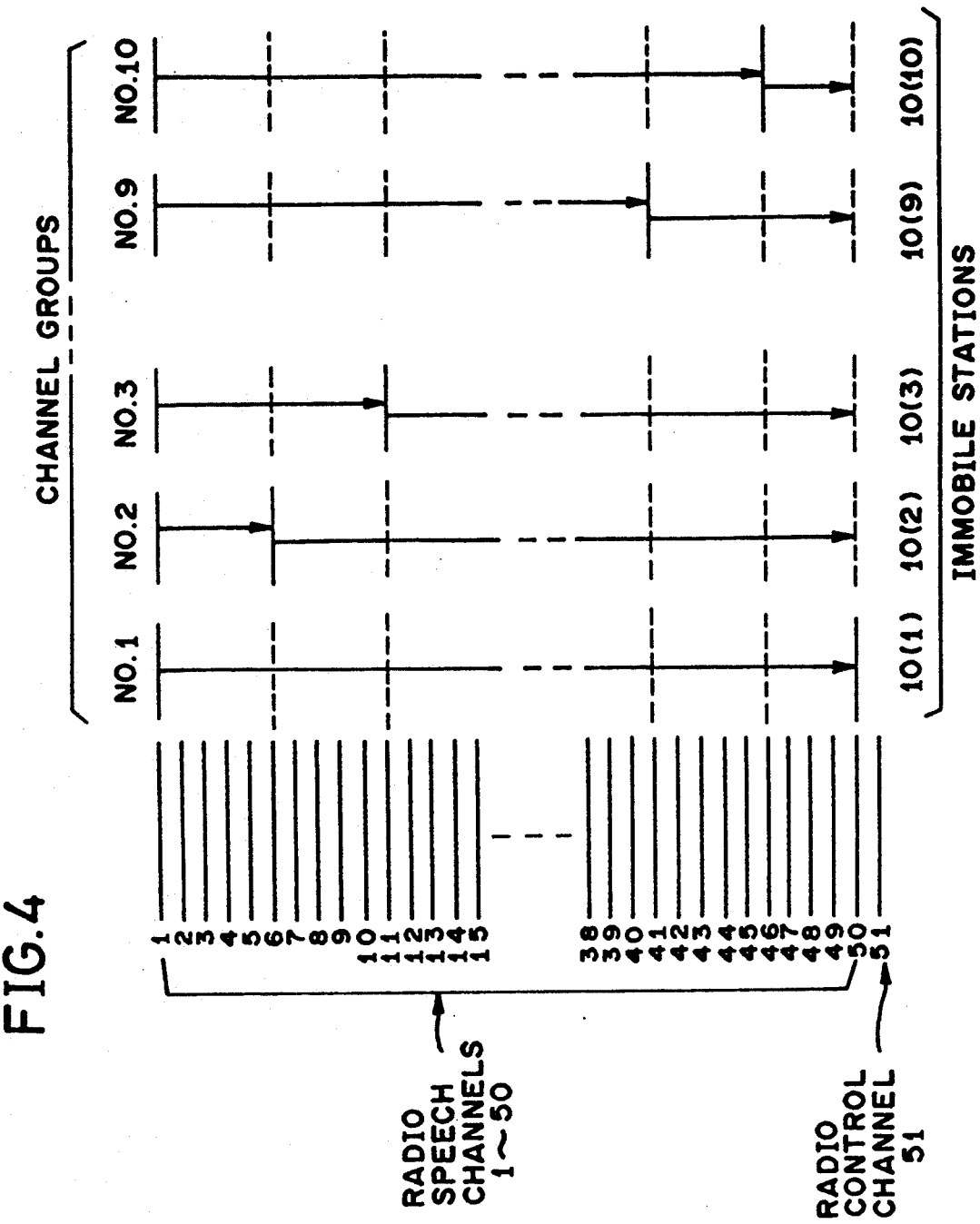
FIG. 4 is a diagram depicting the manner in which channel grouping is carried out in accordance with the present invention.

In order to overcome such a problem, in accordance with the present invention, the stations 10(1)-10(10) are respectively assigned channel groups #1-#10 as shown in FIG. 4. More specifically, the channels Nos. 1-50 are grouped into ten as follows:

(a) Group #1: channels Nos. 1-50;
(b) Group #2: channels Nos. 6-50 and 1-5;
(c) Group #3: channels Nos. 11-50 and 1-10;
(d) Group #4: channels Nos. 16-50 and 1-15;
(e) Group #5: channels Nos. 21-50 and 1-20;
(f) Group #6: channels Nos. 26-50 and 1-25
(g) Group #7: channels Nos. 31-50 and 1-30;
(h) Group #8: channels Nos. 36-50 and 1-35;
(i) Group #9: channels Nos. 41-50 and 1-40; and
(j) Group #10: channels Nos. 46-50 and 1-45.

As shown above, each group forms a loop, in terms of channels numbers, whose direction corresponds to ascending channel number in this case. By way of example, the loop of the group #4 begins at the channel No. 16 and ends at the channel No. 15 after passing through channel Nos. 50 and 1 in this order. It is assumed that the lowest numbered channel in a given loop is the first channel in the loop and the highest numbered channel in the given loop is the last channel in the loop. In the event that there exists a plurality of channels having the same priority in a given loop especially during the initial stage of the system operation, then a given fixed station selects the lowest numbered one among the channels each of which has the same priority and is not used by any of the stations.

This procedure continues until each of the channels exhibits a different priority, whereafter a known technique can be utilized to perform an optimal channel selection according to the priority data stored.

As mentioned previously in connection with FIG. 3, the non-volatile memory (EEPROM) 34 is provided for storing the channel assignment priority data which has been compiled over a long period of time. A multi-station radio communications system employing the dynamic channel assignment, to which the present invention is applicable, is commonly coupled with a commercially available power supply and, therefore a volatile memory is subject to undersirable erasure in the event of a power failure. However, this problem can effectively be minimized through the use of the non-volatile memory 34 as shown in FIG. 3 (second preferred embodiment).

A third preferred embodiment of the present invention will be discussed with reference to FIG. 5, wherein the mobile communications controller 14 is shown in detail and arranged between the telephone network 18 and a plurality of fixed stations 10(1)'-10(10)'. The controller 14 comprises a speech path switching circuit 50, a plurality of interfaces 52(1)-52(10) provided at the side of the telephone network 18, a plurality of interfaces 54(1)-54(10) arranged between the circuit 50 and the stations 10(1)'-10(10)', a microprocessor 56, a main memory 58 and a channel assignment data memory 60, all of which are coupled as shown.

Although not illustrated in FIG. 5, the fixed stations 10(1)'-10(10)' respectively differ from the counterparts 10(1)-10(10) in that each of the former stations is not provided with a non-volatile memory and stores the channel assignment data in a volatile memory such as a RAM. The memory 60 is a non-volatile memory and is provided with a plurality of memory sections which are respectively allocated to store the channel assignment data of the fixed stations 10(1)'-10(10)'.

The microprocessor 56 controls, using an operation program pre-stored in the main memory 58, the overall operation of the switching controller 14, which includes speech path selection by which each of the fixed stations 10(1)'-10(10)' is selectively coupled to a plurality of transmission lines of the telephone network 18. The microprocessor 56, in addition to the above operation control, instructs each of the fixed stations 10(1)'-10(10)' to apply, periodically or non-periodically, the channel assignment data stored in the corresponding volatile memory (not shown) to the controller 14. The data thus applied to the controller 14 are respectively stored in the predetermined memory sections of the data memory 60. Therefore, if a power failure occurs at the fixed stations 10(1)'-10(10)' and/or the controller 14, the channel assignment data up to the power failure can be retained in the non-volatile memory 60. After the recovery of power supply, the microprocessor 56 applies a plurality of data stored in the channel assignment data memory 60 to the corresponding fixed stations 10(1)'-10(10)'. Thus, the worst case can be prevented wherein the whole entire channel assignment data of each of the fixed stations 10(1)'-10(10)' is totally erased.

As an alternative to the above, each of the fixed stations 10(1)'-10(10)' may apply the channel assignment data stored therein to the controller 14 at a predetermined time interval or non-periodically.

While the foregoing description described preferred embodiments according to the present invention, the various alternatives and modifications possible without departing from the scope of the present invention, which is limited only by the appended claims, will be apparent to those skilled in the art.

What is claimed is:

1. A method of assigning radio channels in a multi-station radio communication system wherein plural channels are accessible for communication between plural fixed stations and plural mobile units and wherein each of said plural fixed stations selects a channel according to channel assignment priority, said method comprising steps of:

(a) grouping the radio channels which are numbered in ascending or descending order, into a plurality of channel groups each of which includes the same number of the radio channels, the number of the channel groups corresponding to the number of the fixed stations, the radio channels in each of the channel groups forming a numerically looped sequence of channels which is scanned in a predetermined sequence wherein each numerically looped sequence finishes at a channel which is the channel immediately before the first channel of the predetermined sequence, the first channel of a numerically looped sequence in one channel group being different from the first channel of the numerically looped sequences in each of the other channel groups;

(b) assigning said channel groups to said plural fixed stations on a one-to-one basis; and (c) setting each of said plural fixed stations to select one of the channels assigned thereto which has a highest channel assignment priority, or to select one of the first channel of a numerically looped sequence and a channel nearest to the first channel in the event that plural channels have the same channel assignment priority.

2. A method as claimed in claim 1, further comprising the following step after step (b):

raising a channel assignment priority of a given channel, at a given fixed station, which is accessed and used for communication between said given fixed station and one of the plural mobile units, and lowering the channel assignment priority of the given channel, at the given fixed station, which is accessed but fails to establish a communication between said given fixed station and one of the plural mobile units.

3. A method as claimed in claim 1, wherein a memory for storing said channel assignment priority is a non-volatile memory.

4. A method as claimed in claim 2, wherein a memory for storing said channel assignment priority is a non-volatile memory.

5. A method as claimed in claim 1, further comprising a mobile communications controller provided between said plural fixed stations and a telephone network, said mobile communications controller being provided with a control means and a non-volatile memory, said non-volatile memory having a plurality of memory sections which respectively store the channel assignment priorities of said plural fixed stations, said control means periodically instructing said plural fixed stations to apply the channel assignment priority data thereto and storing the channel assignment priority data in the corresponding memory section of said non-volatile memory.

6. A method as claimed in claim 5, wherein said control means instructs said plural fixed stations to apply the channel assignment priority data thereto, in a non-periodic manner, and stores the channel assignment priority data in the corresponding memory sections of said non-volatile memory.

7. A method as claimed in claim 5, wherein each of said plural fixed stations applies the channel assignment priority data stored therein, at a predetermined time interval, to the corresponding memory section of said non-volatile memory.

8. A method as claimed in claim 5, wherein each of said fixed stations applies the channel assignment priority data stored therein, non-periodically, to the corresponding memory section of said non-volatile memory.

* * * * *